United States Patent [19]

Nishikawa et al.

[11] Patent Number: 4,756,947
[45] Date of Patent: Jul. 12, 1988

[54] GRAINED ARTIFICIAL LEATHER HAVING GOOD COLOR FASTNESS OF ULTRAFINE POLYAMIDE FIBERS

[75] Inventors: Toshio Nishikawa, Shiga; Shiro Imai, Otsu; Kenkichi Yagi, Otsu; Yuriko Yoshida, Otsu; Masato Shimada, Otsu; Junnosuke Nagashima, Kusatsu; Teruo Nakamura, Otsu, all of Japan

[73] Assignee: Toray Industries, Inc., Tokyo, Japan
[21] Appl. No.: 883,716
[22] Filed: Jul. 9, 1986

Related U.S. Application Data

[62] Division of Ser. No. 622,214, Jun. 19, 1984, Pat. No. 4,620,852.

[51] Int. Cl.$^4$ .............................................. D06P 5/04
[52] U.S. Cl. ...................................... 428/151; 8/515; 428/239; 428/288; 428/290; 428/904
[58] Field of Search ............... 428/904, 151, 46, 239, 428/288, 290; 8/515, 516, 436, 437, 543, 622, 623, 624, 635, 685, 926

[56] References Cited

U.S. PATENT DOCUMENTS 4,476,186 10/1984 Kato et al. ..................... 428/904
4,620,852 11/1986 Nishikawa et al. ................ 8/515

Primary Examiner—Marion C. McCamish
Attorney, Agent, or Firm—Austin R. Miller

[57] ABSTRACT

Artificial leather and a dyeing method therefor; the leather includes ultrafine polyamide fibers and is particularly a grained artificial leather having bright, deep color, good color fastness to dry cleaning with charged soap, a delicate touch free from any undesirable rubber-like feeling, as well as high durability.

A super-entangled fiber base is provided comprising ultrafine polyamide fibers and/or bundles thereof; polyurethane including polyoxyethylene of molecular weight of 500–5,000 is applied. The polyamide ultrafine fibers are dyed with a metal-dye complex and a fixing agent.

4 Claims, No Drawings

GRAINED ARTIFICIAL LEATHER HAVING GOOD COLOR FASTNESS OF ULTRAFINE POLYAMIDE FIBERS

This is a division of application Ser. No. 622,214, filed June 19, 1984, now U.S. Pat. No. 4,620,852.

BACKGROUND OF THE INVENTION (1) Field of the Invention

The present invention relates to a grained artificial leather having good color fastness and to a process for dyeing ultrafine polyamide fibers into deep, bright colors, keeping good color fastness to dry cleaning in charged system.

(2) Description of Prior Arts

The grain layers of conventional artificial leathers are made by providing porous or/and non-porous layers of such resins as polyurethane on the porous sheets made of elastic polymers and fiber base such as nonwoven fabric, knitted and woven fabric. However, such resins do not show good dyeability and color fastness, especially to dry cleaning.

Therefore, dope dyeing has been applied to the resins of the grained surface. However, dope dyeing is not suitable for manufacturing artificial leathers of many colors, each quantity of which is not large. Further, the appearance of such artificial leathers is monotonous and opaque due to lack of transparancy and luster.

On the other hand, Japanese patent publication No. 28041/1973 teaches that some kinds of polyurethane whose soft segment is polyethyleneglycol (PEG-type PU) can be dyed with metal complex dyes. However, the artificial leathers comprising PEG-type PU and fiber base of ultra-fine fibers have no great practical value because they have not good color fastness as a whole, owing to insufficient color fastness of the ultrafine fibers. Further, when the fiber base is impregnated or coated with porous resins, the porous resins, whose color fastness to dry cleaning is poor, spoil the appearance of the artificial leathers seriously, not only at the back surface but also the grained surface. The faded porous polyurethane affects the appearance even through the dyed grained surface.

On the other hand, a number of proposals have been made as to leather-like fabrics made of ultrafine fibers, such as suede-like, nubuk-like, woven or knitted fabrics, as well as grained artificial leathers. And, now, extra ultrafine fiber around or less than 0.01 denier is attracting our interests to obtain softer hand or more dense appearance.

However, as fibers become more fine, dyeing deeply and brightly becomes more difficult because of increased surface reflection of the extra fine fibers.

For example, though polyamide fibers such as nylon-6 and nylon-66 have such advantages over polyester fibers as softness, high wear resistance and brightness of color, the use of polyamide ultrafine fibers for clothing has been delayed so far because dyes are very liable to come off in washing and dry cleaning. The reasons of the insufficient color fastness are not known in detail.

Japanese patent publication No. 8128/1981 mentions attempts to improve color fastness by increasing molecular orientation of ultrafine nylon fibers. However their color fastness are insufficient to the dry cleaning in which charge soap is used. The extra-ultrafine fibers around or less than 0.01 denier always show complete fading of color even if they are dyed with the dyes said to give the highest color fastness to fibers of ordinary thickness.

Though thren-type vat dyes (vat dyes derived from anthraquinone) can be also applied to composite sheets of ultrafine polyamide fiber and polyurethane (Laid-Open Japanese patent application publication No. 1365/1980), they can neither give any heavy shade nor show good resistance to synthetic solvent for dry cleaning. Further, they cause photo-tendering for some hues; also the strong base used in dyeing leads to deterioration of polyurethane.

SUMMARY OF THE INVENTION

Important objects of this invention are to provide dyeable artificial leathers, particularly dyeable grained artificial leathers, having good color fastness, bright, deep colors, excellent luster, soft hand and high durability. These objects can be achieved, most preferably, by dyeing an artificial leather comprising a super-entangled ultrafine fiber base and PEG-type PU applied thereon with a metal dye complex.

This invention provides also a method of dyeing extra ultrafine polyamide fibers comprising dyeing with, preferably, a metal dye complex and fixing with tannin and metal salt. The dyeing method makes it possible to provide deep and bright color maintaining sufficient color fastness to dry cleaning for extra-ultrafine polyamide fibers.

The grained surface comprises, preferably, a super-entangled surface mainly made of ultrafine fibers and/or their bundles and polyurethane having at least 5% by weight of polyoxyethylene chain of molecular weights of 500–5,000 based on the total weight of the soft segment.

DESCRIPTION OF THE PREFERRED EMBODIMENTS

The leathers of the invention are obtainable with at least the following four steps (1) to (4) combined:

(1) making a fiber sheet mainly comprising ultrafine fibers or ultrafine fiber formable fibers.

(2) entangling said fiber sheets by applying high-velocity fluid streams to at least one surface thereof.

(3) applying a polyurethane to said surface to which said high-velocity fluid streams are applied, wherein at least 5 weight % of the soft-segment constituents of the polyurethane is a polyoxyethylene chain having a molecular weight of 500 to 5,000.

(4) dyeing said polyurethane with at least one dye selected from the group consisting of metal dye complexes, acid dyes and reactive dyes.

It is preferable for facility of processing and handling to convert the ultrafine fiber formable fibers into ultrafine fibers or bundles thereof at an appropriate stage. They can however be manufactured directly by methods such as wet spinning, super-drawing or melt-blow spinning.

Ultrafine fiber formable fibers include chrysanthemum-like cross-section fibers in which one component is radially sandwiched between other components, multi-layered bicomponent fibers, radially multi-layered bicomponent hollow fibers, and islands-in-sea type composite fibers having fixed or unfixed cross section along the fiber axis. Among them. islands-in-sea type fibers, each island of which has also islands-in-sea configulation whose islands-in-island are extra ultrafine is one of the most preferable one. They are disclosed in U.S. application Ser. No. 533,209, filed Sept. 16, 1983, typically FIG. 1A and FIG. 1P. These ultrafine fiber formable fibers may be used by mixing more than two of the fibers.

For obtaining leathers having soft hand and smooth surface, the thickness of the ultrafine fibers which can be obtained from the ultrafine fiber formable fibers should be less than 0.2 denier, preferably less than 0.05 denier, more preferably less than 0.01 denier.

As materials for the ultrafine fibers, polyamides such as nylon-6 and nylon-66, polyesters such as polyethylene and polybutylene terephthalate, polyacrylonitrile, and their copolymers are preferable among others. Polyamides are particularly preferable because even at less than 0.01 denier they can be deeply colored with good color fastness by the dyeing method stated later.

As binding components (sea components) for ultrafine fiber formable fiber, those readily-separable type ultrafine fiber components or those different in solubility are selected. For facility of spinning and removal, polystyrene, polyethylene, their copolymers, and copolymerized polyester are preferably used. Particularly the copolymers of styrene with acrylic acid and/or methacrylic acid are preferable among them for obtaining strong fibers due to easeness of applying a high draw ratio.

In this invention, to improve color fastness, it is preferable to increase the draw ratio to achieve high molecular orientation or high degree of crystallinity. A draw ratio of more than 2.0, preferably more than 2.5, usually preferable, provided spinning speeds of 600 to 1,500 m/min. are used.

The ultrafine fibers of the grained surface should preferably have sizes less than 0.2 denier. If not, a smooth grained surface is difficult to form because the excessive fiber stiffness affects their smoothness, and their surface forms unsightly creases and cracks, and crumpling readily causes cracks and surface unevenness. Ultrafine fibers of less than 0.2 denier, preferably of less than 0.05 denier, more preferably of less than 0.01 denier can be densely entangled so that the surface is highly smooth, flexible, and not liable to cause cracks, and having soft touch feeling.

The fiber structure of or just beneath the grained surface should preferably have ultrafine fibers and/or their bundles, mutually super-entangled. They should preferably be such that the distance between the fiber entanglement points (defined later) is less than 200 microns. The fiber structures with less entanglement such as entangled only by needle punching are not preferable because they are apt to fluff or crack when subjected to friction, crumpling, or repeated shearing or bending. Such fiber bases require reinforcement with a great quantity of porous resins to maintain their strength and dimensional stability and, consequently, such sheets are poor in dyeing fastness. For the purpose of decreasing porous resins for eliminating such defects, the distance between the fiber entanglement points should be less than 200 microns preferably or less than 100 microns more preferably.

The term "the distance between the fiber entaglement points" is defined in Laid-Open Japanese patent application publication No. 191280/1983 (Tokkai-sho 58-191280), and in U.S. application Ser. No. 479,970, filed Mar. 29, 1983, now U.S. Pat. No. 4,476,186, Granted Oct. 9, 1984, the disclosure of which is incorporated herein by reference, and is further described herein.

A short average distance between points of entanglement evidences a high density of entanglement.

The average distance between the fiber entanglement points is measured in the following manner. When observed from the surface with a scanning electron microscope, the fibers are considered to form an entanglement point when an upper fiber which has passed over and across a lower fiber then passes under and across another fiber. It will be assumed that the constituent fibers are $f_1, f_2, f_3, \ldots$, the point at which two fibers $f_1$ and $f_2$ are entangled with each other is $a_1$ and another point at which the upper fiber $f_2$ is entangled with another fiber with the fiber $f_2$ being the lower fiber is $a_2$ (the entanglement point between $f_2$ and $f_3$). Similarly, the entanglement points $a_3, a_4, a_5, \ldots$ are determined. The linear distances $a_1 a_2, a_2 a_3, a_3 a_4, a_4 a_5, a_5 a_6, a_6 a_7, a_7 a_3, a_3 a_8, a_8 a_7, a_7 a_9, a_9 a_6, \ldots$ measured along the surface are the distance between the fiber entangling points and their average is taken.

In the present invention, the fibers of the surface portion preferably have an average distance between the fiber entangling points of less than about 200 microns as measured by this method. In fiber structures where the average distance between the entangling points is greater than about 200 microns, such as in those fiber structures in which the entanglement of the fibers is effected only by needle punching, only little entanglement of the fibers occurs.

If fiber entanglement is so dense that the distance between its points is less than 200 microns, the amount of polyurethanes applied thereto can be decreased. Namely it is possible to decrease porous polyurethane to be impregnated in the fiber base or to decrease the thickness of polyurethane layer applied to the surface. The former spoils color fastness and the latter spoils soft hand and delicate appearance. The fiber base may be nonwoven, laminated nonwoven or woven or knitted fabrics laminated and entangled with a nonwoven. Among them, nonwoven fiber base comprising surface portion of super-entangled ultrafine fibers and/or their bundles, said ultrafine fibers and/or their bundles branched from the ultrafine bundles of the inner portion, is most preferable. It is preferable that the degree of branching and entanglement varies at the boundary between the both portions. By applying water jet streams to the ultrafine formable fiber sheet, entanglement and branching often occur throughout its thickness. The dense entanglement and branching around the surface portion brings about the sheet a smooth surface and excellent stabilities such as against fluff and deformation. Looser entanglement than the surface of the inner portion brings about softness to the sheet.

The amount of resin depends on the purpose. For clothing, however, they should preferably be 0 to 50% and more preferably less than 20% based on the fiber weight.

The resins used for the grain layer in accordance with the invention are required to be urethane polymers having at least 5 weight % of polyoxyethylene chains with molecular weights of 500 to 5,000 based on the total weight of the soft segment. If the polyoxyethylene chain is less than 5 weight %, bright colors are difficult to obtain by dyeing. The molecular weight of polyoxyethylene chain is required to be 500 to 5,000 for keeping the softening temperature, resistance to flexing and solvent within their practicable range.

The polyurethanes whose soft segment contains polyoxyethylene chains should preferably be dyed with anionic dyes such as metal dye complexes, acid dyes and reactive dyes because they are highly affinitive thereto and particularly dyeable with metal dye complexes and have good color fastness.

They may of course be blended or copolymerized with a proper quantity of another polyether, polyester and copolymerized polyester for improving mechanical strength.

The polyurethane polymers in accordance with the invention are not limited to the linear type and may be the cross-linked type, such as cross-linked with hexamethylene diisocyanate trimer, for example. Cross-linked polyurethanes generally improve resistance to scratch, scuff, organic solvent and hot water, but are defective in flex resistance. However, in the present invention, flex resistance is much improved with a super-entangled surface structure.

The soft segment of the polyurethane may be polyoxyethylene glycol alone, but may also be its mixtures with polyether diols such as polyoxypropyleneglycol, polyoxytetramethyleneglycol and polyesterdiols such as polyethyleneadipate, polybutyleneadipate, polyhexamethyleneadipate and polycaprolactone, and copolymers thereof.

PEG-type PU may be mixed with other polyurethane so that the amount of polyoxyethylene segment is more than 5 weight % based on the total weight of the soft-segment of the polyurethane.

As the organic diisocyanates used to make the polyurethane include aromatics such as diphenylmethane-4 4'-diisocyanate, aromatic-aliphatics such as xylylenediisocyanate, aliphatic diisocyanates such as hexamethylenediisocyanate, and alicyclic ones such as isophoronediisocyanate and hydrogenated diphenylmethane-4,4'-diisocyanate. Among them, aromatic diisocyanates, particularly diphenylmethane-4 4'-diisocyante, is preferable for obtaining good physical characteristics such as thermal stability, solution stability and fracture strength.

Alicyclic diisocyanates such as isophorones are preferable for obtaining anti-yellowing (not easily colored even when exposed to sun) type polyurethanes.

Chain extenders for the polyurethane include water, low-molecular diols such as ethyleneglycol and propyleneglycol, aliphatic diamines such as ethylenediamine, aromatic diamines such as 4,4'-diaminodiphenylmethane, alicyclic diamines such as 4,4'-diaminodicyclohexylmethane and isophoronediamine, alkanolamines such as ethanolamine, hydrazines, and dihydrazides such as succinic. Among these the diamine compounds are preferable and 4,4'-diaminodiphenylmethane is particularly preferable for practical use because of its heat resistance and 4,4'-diaminodicyclohexylmethane is more preferable for light resistance. They may of course be used alone or in combination.

The polyurethanes are generally manufactured in the presence of solvents. Suitable solvents are dimethylformamide (referred to DMF hereinafter), dimethylacetamide, ethylacetate and toluene. Among them DMF should be preferably used. Elastomers other than polyurethane such as polyamide, polyester, polyvinyl chloride, polyacrylic ester copolymers, neoprene, styrene-butadiene copolymers, acrylonitrile-butadiene copolymers, polyamino acid, polyamino acid-polyurethane copolymers, and silicone resins may be mixed with the polyurethanes, and if necessary may be applied in less than 10 microns thickness to the grained surface of the present invention. As a matter of course, plasticizers, fillers, stabilizers, crosslinking agents and so forth may be added thereto.

When flexibility and soft feeling are particularly demanded, the resin should be present in great quantities at the uppermost very-thin portion of the grained surface and not at all or only in a small quantity at the other portions.

The deep luster and bright color are obtainable by dyeing the leathers with one or more dyes selected from the anionic dyes which have a negative charge in aqueous solution such as metal dye complexes, acid dyes and reactive dyes. Further, when polyamide ultrafine fibers are used, the dyeing method described later is particularly preferable for obtaining a heavy shade and high color fastness.

For other ultrafine fibers than polyamide, on the other hand, the polyurethanes and ultrafine fibers can be colored independently.

The color of the urethane polymers may be improved by preliminarily adding dyes and/or pigments thereto.

For making ultrafine fibers, islands-in-sea type fibers are representative. They are produced, for example, by using a spinning system mentioned in Japanese patent application publication No. 18369/1969 (Tokko-sho 44-18369) or dope mixed spinning. Usually ultrafine fiber formable fibers are cut into short fibers, crimped with a stuffing box, formed into a web and subjected to needle punching. Or, continuous filaments are spread into a sheet without cutting and are subjected to needle punching. Further the ultrafine fiber formable fibers may be placed on and entangled with other nonwoven, woven knitted fabrics. After that or occasionally without needle-punching, high-velocity fluid streams are applied to the sheet. Water is most preferably used among other fluids. The branching and entanglement of the fibers are achieved through the treatment. The ultrafine fiber formable fibers may be converted into ultrafine fibers before high pressure fluid treatment. In such a case, the pressure of the fluids may be 5-100 kg/cm$^2$. Even before converting, a similar pressure may be applied for easily separable fibers. However, 100-300 kg/cm$^3$ is preferable for the fibers not easy to separate. The degree of branching and entanglement can also be changed by changing contact times. Pressure may be changed each time of contact. The degree of ultrafining can be controlled by treating the fiber sheets with solvents of at least a part of the components. The dissolution of part of the fibers can be carried out even after impregnating or coating resins. In this case, the products become softer because many spaces (where part of the components were) formed along the fiber axis in the product.

The resin solution or dispersion for the grained surface may be applied by a reverse roll coater, gravure coater, knife coater, slit coater, or by spraying other methods. The coated surface is pressed and if necessary heated for smoothing or embossing the surface. Sometimes pressing the fiber sheet before coating the resin is also effective for improving smoothness.

In this invention a heavy shade and high color fastness of the polyamide ultrafine fibers is attainable through color fixing after dyeing with metal dye complexes.

Generally speaking, polyamide fibers such as nylon-6 can be dyed beautifully with acid dyes, disperse dyes or metal dye complexes. However, ultrafine polyamide fibers less than 0.2 denier are inferior to ordinary fibers in color fastness. This trend is remarkable for extra-ultrafine fibers of less than 0.01 denier.

We have found that ultrafine polyamide fibers can be deeply dyed using metal dye complexes such as mordant dyes, acid mordant dyes, 1:1 metal-complex dyes, 2:1 premetallized dyes and metal complex direct dyes of molecular weights more than 700, more preferably of more than 900. The methods include dip drying, pad steam drying and pad drying, and are not so limited. Among the dyes, 2:1 premetallized dyes of higher molecular weighs are easy to produce. We have also found that ultrafine fibers of less than 0.01 denier, particularly with 0.001 denier, can unexpectedly be dyed beautifully with so-called Irgaran-type metal complex dyes having low-hydrophilicity groups such as sulfonamide and sulfonmethyl groups.

The metal dye complexes enhance bonding with the fibers by forming complex salts between the dye molecules and chrome or other metal atoms, and can provide ordinary fibers with good color fastness but in case of ultrafine fibers almost all color fade by dry cleaning with charge-soap containing synthetic solvents.

We, however, have discovered that remarkable effects are obtained by fixing synthetic tannins and tannic acid derivatives (synthetic and natural) or tannins and metal salts in combination after dyeing with metal dye complex dyeing. The fixing after dyeing with metal dye complexes has been said to be neither effective nor necessary for ordinary fibers at all. However, the fixing with tannins and metal salts ensures good color fastness even to the extra ultrafine fibers in the dry cleaning with synthetic solvents (perchlene) which is said to have the strongest cleaning power.

The term "tannins" in accordance with the invention is generically given to hydrolysable tannins, condensed tannins and complex tannins which have both properties. They are contained in the bark, leaves, roots and fruits of plants. Preferable tannins are gallotannins (tannic acid) classified in the category of hydrolytic tannins that are represented by Chinese gallotannin and gallic acid.

The metal salts in accordance with the invention include antimony complex salts, iron salts, chrome salts, copper salts, bismuth salts and their complex compounds. Preferable among them is potassium antimonyl tartrate in the category of antimonide complex compounds.

Such fixing methods may be conducted by a continuous 2-bath process or may be carried out by a separate 2-bath process, namely, impregnation with tannin solution, drying the impregnated sheet, impregnation with metal salt solution and drying, in this order. In the former, the temperaure can be set at 25° to 100° C. Too low temperatures lower the solubility and adsorbability of the fixing agent. On the contrary, too high temperature causes dissolving out of the absorbed dye into the treating solutions. Temperatures of 40° to 85° C., particularly 50° to 80° C., are therefore preferable. They satisfactorily ensure fixing effects.

The mechanism of fixing is not known in detail, but it can be assumed that a layer of fixing agent is formed on the surfaces of the ultrafine fibers and the layer multiplicatively enhances the affinity between the dyes and fibers so that dyes become difficult to move. Though such fixing treatment tends to harden the sheets, it is however also amazing that the beneficial effects of this invention are retained even after finishing through mechanical crumpling.

Such crumpling methods are not limited and include dry heat mechanical crumpling and wet heat and hot water tumbler crumpling. Crumpling can be carried out simultaneously with fixing by using liquid flow dyeing machines.

The fiber sheets thus obtained may be further subjected to washing and finishing agent treatment, if necessary, after dyeing and fixing. Further, the addition of polyurethanes or the use of raising such as buffing can be applied either before or after dyeing and fixing. Surface active agent treatment is preferable for dyeing the fiber sheets impregnated with elastomers other than PEG-type PU. That is, because other type polyurethanes suitable for impregnation are extremely inferior in color fastness, it is rather preferable to preliminarily remove the dyes absorbed to the impregnated elastomers with surface active agents.

Among such surface active agents, anionic, nonionic and amphoteric surfactants are effective. Particularly the latter two are preferable. Particularly preferable among them are polyoxyalkylene nonionic and betaine amphoteric surface active agents. The former include polyoxyalkylenealkylamines, polyoxyethylenealkylethers, polyoxyethylenealkylarylethers, polyoxyethylenethioethers, polyoxyethylenealkylesters, polyoxyethylenealkylamides, polyoxyethylenepolyoxypropylenes, polyoxyethylenealkylphenols and polyoxyethylenephenylethers, for example.

When the fiber sheets are prepared with multi-layered ultrafine fiber formable fibers made of polyamide and polyester and the products are subjected to multi-color dyeing, melange colored products having good color fastness can be obtained.

Heretofore, description has been mainly made as to fiber dyeing and fixing after sheet formation. However, it is needless to say that the order of the sheet formation and the dyeing may be changed arbitrarily.

EXAMPLE 1

A staple of islands-in-sea type fibers (4 denier, 51 mm length) having 7 islands, each island consisting of many islands-in-island (I-I-I) and sea-in-island (S-I-I), was obtained by spinning at a speed of 1,200 m/min, drawing at a ratio of 2.6, being subjected to crimping and cutting. The islands-in-sea type fiber was composed of 65 parts of acrylic acid-styrene copolymer (referred as AS resin hereinunder) as the sea and the S-I-I component and 35 parts of nylon-6 as the I-I-I component. The average thickness of the I-I-I was 0.002 denier.

A web was formed through carding, cross-lapping and needle-punching with single-barbed needles for entanglement. The sheet had a weight of 430 gr./m$^2$, an apparent density of 0.17 gr./cm$^3$ and an average distance between the entanglement points of 378 microns. Both surfaces of the sheet were treated one time with high-velocity fluid streams of 100 kg/cm$^2$ pressure from a nozzle having 0.25 mm diameter holes arranged in one row at 2.5 mm intervals, while oscillating the nozzle. The nonwoven sheet thus obtained had a super-entangled structure in which the islands-in-sea type fibers were branched into extra ultrafine fibers and/or their bundles, and the average distance between the fiber entanglement points was 56 microns at the surface.

Next the nonwoven sheet was shrunk in 85° C. hot water, dried and smoothed between a rubber rolls and a hot iron roll having a smooth surface.

A prepolymer obtained from polyoxyethyleneglycol of molecular weight of 600 and isophoronediisocyanate was chain extended with 4,4'-diaminodicyclohexylmethane, terminated at the end with ethanolamine and cross-linked with 15 parts of a hexamethylenediisocyanate trimer. Then the cross-linked polyurethane was coated with gravure coater, on the smoothed surface. The amount of coating was 5 gr./m². The coated surface was pressed with a hot emboss roll, for embossing and integrating the coated resin with the super-entangled surface.

Thereafter AS resin was almost completely removed with trichloroethylene and the islands-in-sea type fibers were ultrafined.

The sheet thus obtained was subjected to dyeing and fixing using a wince dyeing machine under the following conditions.

Dyeing:
 Dyestuff: Irgalan Black GBL 200%, 10% owf
 Dyeing temperature×time: 98° C.×60 min.
Fixing:
 Fixing agents: tannic acid and tartar emetic
 Treating method: treatment with weakly acidic bath containing 10% owf tannic acid at 50° C., for 50 min. and, treatment with weakly acidic bath containing 5% owf tartar emetic at 50° C., for 50 min.

Next, after adding a finishing agent, the sheet was softened with a tumbler crumpling machine and dried.

Both the grained surface and the reverse surface of the thus-obtained sheet were colored dark black. It showed a softness free from undesirable rubber-like feeling and the grained surface had a deep luster, resistance against scuff and repeated bending. Its washing and drycleaning fastness according to JIS-L0844, L0860 (2% charge soap content) was good.

COMPARATIVE EXAMPLE 1

A grained artificial leather was obtained according to the same manner except using anti-yellowing (not easily colored even when exposed to sunlight) type polyester polyurethane instead of the PEG-type PU.

It showed a natural leather-like appearance as that of Example 1. However the grained surface, upon dyeing was dyed into dark-blue and not dark black. Further, the color of the grained surface was seriously faded by dry cleaning with the use of 2% charge-soap.

COMPARATIVE EXAMPLE 2

The same needle-punched sheet as Example 1 was immersed in a 15% aqueous solution of polyvinyl alcohol (referred to as PVA hereinafter) at 85° C., shrunk simultaneously, dried, impregnated with a 10% DMF solution of polyester polyurethane, coagulated with 30% DMF aqueous solution and sufficiently washed in 80° C. hot water for removing PVA and DMF.

Next, the sheet was subjected to surface smoothing with a hot roll and the same treatment as Example 1. The sheet showed unevenly colored lines or portions like stood veins along ultrafine fiber bundles, and cracks arose during the dyeing, and ultrafine fibers were exposed therefrom. Further it had a hard touch, unbright color and a feeling not natural leather-like as compared. with Example 1.

Further when picked up by the fingers, so bent as to have an acute angle, and rubbed against the thigh part of the trousers with heavy pressure applied, the comparative example 2 leathers produced a peeled grained surface and exposed raising while the leather of Example 1 did not change in appearance at all.

EXAMPLES 2-5, COMPARATIVE EXAMPLE 3 AND 4

The needle-punched sheet obtained in Example 1 was super-entangled with the high-velocity fluid streams on one side thereof in the same manner as Example 1, immersed in an 8% aqueous PVA solution at 85° C. for PVA impregnation and for sheet shrinkage for a time and dried.

Next a 7% DMF solution of polyester polyurethane to which a small quantity of carbon black was added was impregnated and coagulated with water and washed in hot water at 80° C. sufficiently for removing PVA and DMF.

Thereafter the super-entangled surface of the impregnated sheet was coated with a DMF solution containing 10% polyurethane obtained by chain extending the prepolymers between diphenylmethane-4,4'-diisocyanate and high molecular weight diol mixtures composed of polyoxyethyeleneglycol (molecular weight, 2,000) and polyethylenebutyleneadipate (molecular weight, 2,000) at mixing ratios of:

(A) 100/0 (Example 2)
(B) 50/50 (Example 3)
(C) 10/90 (Example 4)
(D) 5/95 (Example 5)
(E) 3/97 (Comparative Example 3)
(F) 0/100 (Comparative Example 4)

in which the chain extending reaction was carried out adding a small amount of 1,2,2,6,6-pentamethyl-4-hydroxypiperidine. Coating of the DMF solution was carried out with a gravure coater so that the amount of applied polyurethanes were 6 gr./m² (base on solid weight). Then the coated sheets were dried and pressed with a hot emboss roll so that the base sheet and the coated layer were integrated.

Next, the embossed sheet was immersed in trichloroethylene and repeatedly subjected to immersion and squeezing for removal of AS resin.

Further the other side not embossed was raised through buffing.

The sheets (A), (B), (C), (D), (E) and (F) thus obtained were dyed with vinylsulphone reactive dye, Dlamira Brill Red F3B, at a bath ratio of 1:50, a dye concentration of 20 gr/lit. and a temperature of 50° C. using a liquid flow dyeing machine for 60 minutes, and finished normally.

The leathers thus obtained looked like natural grain leathers, had softness free from rubbery elasticity and showed a comparatively-long ultrafine fiber nap on one side, and a grained surface with a high quality appearance. Further, as shown in Table 1, the leathers (A), (B), (C) and (D) showed a grained surface with a deep luster and a bright color, while leather (E) showed an uneven-dyeing spot pattern though it was improved in color depth and leather (F) was of low value because of considerable uneven coloring, the resin part of the grained surface being little colored.

The dye fastness properties of leathers (A), (B), (C), and (D) were not a problem as shown in Table 1.

The distances between the entanglement points of the component fibers at the grained surface were measured after removing the polyurethane and finishing agents with solvent extraction. The measured value of all were about 60 microns.

TABLE 1

| Leather Sheet | Color Depth L-value | Color Depth Naked eye judgement | Color Fastness (grade) | Quality Naked eye judgement |
|---|---|---|---|---|
| (A) | 55.9 | good | 4 4 4–5 | good |
| (B) | 56.8 | good | 4 4 4–5 | good |
| (C) | 57.8 | good | 4 4 4–5 | good |
| (D) | 58.4 | good | 4 4 4–5 | good |
| (E) | 60.1 | improved | 4 4 4–5 | improved |
| (F) | 62.4 | poor | 4 4 4–5 | poor |

(1) The measurements were made by MS-2000 Color Difference Meter manufactured by Macbeth (2) The dry cleaning fastness properties were measured under JIS L-0860. The numeral values of discoloration and fading, contamination and color-off are listed in the order of mention.

EXAMPLE 6

A similar type of staple (3.5 denier, 51 mm length, 7 islands) fiber cosisting of 60 parts of an AS resin as sea and S-I-I component and 40 parts of nylon-6 as I-I-I component was obtained by spinning at 1,200 m/min., drawing at a ratio of 3.0, crimping and cutting. The I-I-I had a mean thickness of 0.003 denier.

The staple fibers were subjected to a card and cross lapper to form webs. The web was needle-punched with single-barbed needles. The needle punched sheet had 380 gr./m² in weight and an apparent density of 0.21 gr./cm³. High-velocity fluid streams were applied to both surfaces of the needle-punched sheet two times respectively at a pressure of 100 kg/cm² with a nozzle having the 0.25 mm diameter holes arranged in one row at 2.5 mm intervals while the nozzle was oscillated. The sheet thus obtained showed the ultrafine fibers and/or their bundles super-entangled at the surface and branched from the islands-in-sea type fiber of the inner portion.

Next, the super-entangled sheet was shrunk in 85° C. hot water, dried, and repeatedly subjected to immersion in trichloroethylene and squeezing for the almost-complete extraction removal of AS resin. Thereafter a raised sheet was obtained by lightly buffing one side of the nonwoven sheet using a roll sander type buffing machine.

Next, the raised sheet was subjected to dyeing and fixing with a wince dyeing machine under the following conditions.

Dyestuff: Irgalan Red Brown RL-200%, 10% owf
Dyeing temperature×time: 98° C.×60 min.
Fixing agent: tannic acid, tartar emetic
Treating method: treatment with weakly acidic bath of 10 % owf of tannic acid at 50° C. for 50 min. and, treatment with a weakly acidic bath of 5% owf tartar emetic at 50° C. for 50 min.

The sheet was washed with hot water and dried. A wine-colored nubuk type artificial leather was obtained. Though no polyurethane binder was added, the sheet showed excellent dimensional stability and had an extra ultrafine fiber nap at the surface (raised), a soft touch free from undesirable elasticity, a high drapability, a heavy shade dyeing and as elegant an appearerance as natural nubuks. Further it showed little discoloration and fading (color-off) even after dry cleaning with a synthetic solvent with a 2% content of charge-soap.

COMPARATIVE EXAMPLE 5

A nubuk type artificial leather was obtained according to Example 6 except without the fixing with the tannic acid and tartar emetic in Example 6. The nubuk type artificial leather showed the same high-grade appearance as Example 6 but when subjected to the dry cleaning with a charge-soap containing synthetic solvent almost all the color came off and considerable fading occurred.

EXAMPLE 7

A 76 denier/20 filament yarn similar to that of Example 1 (the mean size of I-I-I: 0.008 diner) was obtained through spinning and drawing at a ratio of three. The filament consisted of 60 parts of AS resin as sea and S-I-I component and 40 parts of nylon-6 as I-I-I component and had 12 island components per filament. A double weave was obtained by weaving the filament yarn as the first weft and 75-denier/100 nylon-6 textured yarn as the warp and second weft. The weave had a 5-leaves satin construction mainly composed of the islands-in-sea fiber at the surface and a ⅜ twill construction mainly composed of the textured filaments at the reverse surface. The density of this weaving was 110 warps/inch and 165 wefts/inch.

The textile was immersed in 85° C. hot water, for removing sizing agent of the warp and for shrinkage at a time, and dried.

Next, the textile was subjected to trichloroethylene immersion and squeezing repeatedly for almost complete extraction removal of the AS resin and to ultrafining of the weft yarn. Next, after a raising oil agent was added, nap was raised using a raising machine. Thereafter the productit was subjected to dyeing and fixing using a liquid flow dyeing machine under the following conditions.

Dyeing conditions:
Dyestuff: Irgaian Navy Blue B 10% owf
Dyeing temperature×time: 98° C.×60 min.
Fixing conditions:
Fixing agents: tannic acid, tartar emetic Treating method: treatment with a weakly acidic bath containing 10 % owf tannic acid at 60° C. for 30 min. and, treatment with weakly acidic bath containing 5 % owf tartar emetic at 60° C. and 30 min.

Thereafter the textile was washed in hot water and dried and treated with a finishing agent.

The textile showed very dense naps, a soft surface touch, a lustrous navy-blue color and a high-grade nubuk type appearance.

The textile showed good color fastness, causing little color-off and surface (raised part) fading, even after dry cleaning with perchloroethylene with a 2% content of charge-soap.

COMPARATIVE EXAMPLE 6

A nubuk type textile was manufactured in the same manner as Example 7 except that Nylosan Blue F-GBL (high fastness type acid dye) and Nylon Fix-TH (multivalent phenol derivative) as fixing agent were used. The textile was dyed grayish blue.

When washed with the perchloroethylene with a 2% content of charge-soap, The product was of little value because the color of the raised ultrafine fibers of its surface were badly faded.

EXAMPLE 8

Islands-in-sea fibers (3.5 denier, 51 mm length, 36 islands, thickness of each island 0.05 denier) composed of 50 parts of AS resin as sea component and 50 parts of nylon-6 as islands component was processed in a card and a cross lapper to form webs, and was needle punched with single-barbed needles.

Next the needle punched sheet was immersed in a 12% PVA aqueous solution at 85° C., for shrinking and impregnating with PVA at a time, and dried. Thereafter the AS resin was almost completely removed by extracting with trichloroethylene. Next it was impregnated with a 12% DMF solution of polyetherpolyurethane, solidified in water, and subjected to removal of PVA and DMF in hot water.

Thereafter both surfaces of the nonwoven sheet were buffed and a sheet with a 30% content of polyurethane was obtained.

The sheet was subjected to dyeing and fixing using a liquid flow dyeing machine under the following conditions.

Dyeing conditions:
  Dye: Irgalan Red Brown RL 200% 10% owf
  Kayakalan Red BL 2% owf
  Dyeing temperature × time: 98° C. × 50 min.
Fixing conditions:
  The same as Example 7

Thereafter the sheet was washed with water and treated with a 20 gr./lit. aqueous solution of Bisnol A-30 (alkylamine type nonionic surface active agent manufactured by Ipposha Yushi Co.) at 60° C. for 20 minutes. It was further washed with hot and cold water.

The artificial suede thus obtained had a soft hand, a heavy shade and high color fastness, and showed no color fading even after dry cleaning with a synthetic solvent (perchlene) with a 2% content of charge-soap.

We claim:

1. A grained artifical leather comprising a super-entagled fiber base of ultrafine polyamide fibers and/or bundles thereof, which polyamide is dyed with a metal dye complex and treated with a fixing agent, and a polyurethane having a soft segment applied on the fiber base, wherein at least 5 weight % of the soft-segment of the polyurethane is a polyoxyethylene chain having a molecular weight of 500–5000.

2. A grained artificial leather as claimed in claim 1, wherein said ultrafine fibers and/or bundles thereof are branched from ultrafine fiber bundles or ultrafine fiber formable fibers of the inner portion of the fiber base.

3. An artificial leather as claimed in claim 1, wherein said inner portion of the fiber base contains substantially no resin.

4. An artificial leather as claimed in claim 1, wherein the distance between the fiber entagling points in the super entangled fiber base is less than about 200 microns.

* * * * *